United States Patent
Perritt, Jr.

(10) Patent No.: US 12,494,574 B1
(45) Date of Patent: Dec. 9, 2025

(54) ADAPTIVE MULTI-BAND FERRITE HELIX ARRAY WITH HYBRID CONDUCTOR SYSTEM AND ELECTRONIC BEAM STEERING AND METHOD FOR USE

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 19/318,179

(22) Filed: Sep. 3, 2025

(51) Int. Cl.
*H01Q 3/24* (2006.01)
*G01R 29/08* (2006.01)
*H01Q 7/06* (2006.01)

(52) U.S. Cl.
CPC ......... *H01Q 3/247* (2013.01); *G01R 29/0807* (2013.01); *H01Q 7/06* (2013.01)

(58) Field of Classification Search
CPC ....... H01Q 3/247; H01Q 7/06; G01R 29/0807
USPC ......................................................... 342/372
See application file for complete search history.

(56) References Cited

U.S. PATENT DOCUMENTS

| | | | |
|---|---|---|---|
| 5,767,807 A | 6/1998 | Pritchett | |
| 6,958,735 B2 | 10/2005 | Handelsman | |
| 7,330,152 B2 | 2/2008 | Zhang | |
| 9,160,074 B2 | 10/2015 | Desclos | |
| 9,379,441 B2 | 6/2016 | Martek | |
| 10,170,833 B1 * | 1/2019 | Hollenbeck | H04B 7/086 |
| 10,355,358 B2 | 7/2019 | Desclos | |
| 2011/0080325 A1 * | 4/2011 | Livneh | H01Q 9/18 |
| | | | 343/702 |
| 2015/0116153 A1 | 4/2015 | Chen | |

FOREIGN PATENT DOCUMENTS

| | | | | |
|---|---|---|---|---|
| CN | 101124734 A | * | 2/2008 | |
| KR | 20220005952 A | * | 1/2022 | H01Q 1/243 |

* cited by examiner

*Primary Examiner* — Harry K Liu
(74) *Attorney, Agent, or Firm* — Henry H. Perritt, Jr.

(57) ABSTRACT

A hybrid adaptive multi-band ferrite helix array antenna system for HF communications incorporates a segmented ferrite core with controllable segments using optimized ferrite materials for specific frequency ranges, and features both flat copper tape and Litz wire conductors with electronic switching for optimal performance across frequency ranges. A segmented cap hat system varies electrical diameter control and elevation patterns. Electronic switching networks with PIN diodes and distributed varactor diodes enable continuous frequency tuning. Three-dimensional beam steering occurs through coordinated control of segment phasing, parasitic elements, and cap hat asymmetry, and achieves a broad operating frequency coverage of 1.6 MHz to 54 MHz with automatic mode selection and machine learning optimization. The compact package measures 420 mm height by 200 mm diameter, providing comprehensive HF and 6-meter band performance, with efficiency ranges from 15% to 85% and sub-100 μs pattern switching capability. This system is suitable for mobile and space-constrained applications.

15 Claims, 16 Drawing Sheets

ADAPTIVE MULTI-BAND FERRITE HELIX ARRAY WITH HYBRID CONDUCTOR SYSTEM AND ELECTRONIC BEAM STEERING AND METHOD FOR USE

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT Not applicable

INCORPORATION-BY-REFERENCE OF MATERIAL

Not applicable

STATEMENT REGARDING PRIOR DISCLOSURES BY THE INVENTOR OR A JOINT INVENTOR

Not applicable

BACKGROUND

Field of the Disclosure

This disclosure relates generally to high frequency (HF) antennas operating in the 1.6 to 54 MHz range, and more particularly to miniaturized ferrite core antennas with electronically controllable radiation patterns, frequency response, and hybrid conductor systems for enhanced performance across the complete HF spectrum and 6-meter amateur band.

Description of Related Art

High frequency (HF) communication in the 1.6 to 30 MHz range, and extending into the 6-meter band (50-54 MHz), presents significant challenges for antenna design due to wavelength requirements. At these frequencies, conventional antennas require physical dimensions ranging from tens to hundreds of meters for efficient radiation, making them impractical for mobile, maritime, aerospace, and space-constrained applications.

Traditional Ferrite Core Antennas

Ferrite core antennas have been employed to reduce physical size by utilizing the high permeability of ferrite materials to increase the electrical length of the antenna effectively. U.S. Pat. No. 3,599,214 to Snyder discloses a basic ferrite rod antenna for AM broadcast reception. U.S. Pat. No. 4,381,566 to Kane describes a ferrite core loop antenna system. These prior art systems suffer from several fundamental limitations, however:

1. Narrow Bandwidth: Traditional ferrite antennas exhibit very narrow bandwidth due to high Q factor, typically less than 1% of the center frequency.

2. Fixed Radiation Pattern: Prior art ferrite antennas provide only omnidirectional or bidirectional patterns with no electronic steering capability.

3. Single Band Operation: Existing designs are optimized for operation within a single frequency band and require manual retuning for other frequencies.

4. Efficiency Degradation: Known ferrite antennas show poor efficiency above 10 MHz due to core losses and parasitic effects.

5. Limited Frequency Range: Conventional ferrite antennas typically cover only narrow portions of the HF spectrum.

Miniaturization Approaches

Various approaches to HF antenna miniaturization have been attempted. U.S. Pat. No. 4,730,195 to Phillips et al. describes a helical antenna with loading elements, but lacks electronic control and multi-band capability. U.S. Pat. No. 10,044,107 to Elliott et al. discloses a folded monopole antenna, but does not address ferrite loading or electronic beam steering.

U.S. Pat. No. 7,855,696 to Poilasne et al. describes antennas using artificial magnetic conductors, but these systems are complex, expensive, and do not provide the frequency agility required for modern applications.

Electronic Tuning Systems

U.S. Pat. No. 8,629,811 to Grandfield et al. describes an electronically tunable antenna but does not utilize ferrite cores or provide beam steering capability. The system relies on varactor diodes for tuning but lacks the segmented approach necessary for wide frequency coverage.

U.S. Pat. No. 8,872,719 to Warnick discloses a phased array system but requires multiple separate antenna elements and does not address the miniaturization challenges of HF operation.

Limitations of Prior Art

Prior art systems fail to address the fundamental challenge of providing a single, compact antenna system that can:

Cover the complete HF spectrum (1.6-30 MHz) plus 6-meter band (50-54 MHz)·

Provide electronic beam steering and pattern control

Adapt automatically to changing propagation conditions

Maintain reasonable efficiency across all operational frequencies

Operate with minimal user intervention

A need remains for a compact HF antenna system that combines ferrite core miniaturization, electronic frequency agility, adaptive beam steering, and hybrid conductor technologies to achieve superior performance across an extended frequency range.

REFERENCE TO A TABLE/PROGRAM LISTING/OTHER

Brief Summary

The present disclosure provides an adaptive multi-band ferrite helix array with hybrid conductor system ("AMFHF-HCS") that offers a comprehensive solution for overcoming the limitations of prior art high-frequency (HF) antennas, leveraging an innovative combination of multiple advanced technologies.

The AMFHF-HCS includes a miniaturized HF antenna system with a cylindrical ferrite core, multiple axial segments, and a hybrid conductor approach that utilizes flat copper tape and Litz wire conductors. The system features electronic switching means to select optimal conductor types based on operational frequency and efficiency requirements, ensuring continuous frequency tuning and optimized performance characteristics across the extended frequency range.

Additionally, the disclosure includes an electronically controllable cap hat system, distributed varactor diodes, and switchable parasitic elements to provide impedance matching optimization, pattern control, and three-dimensional beam steering capabilities.

The AMFHF-HCS can operate in multiple modes, including segmented operation, folded monopole configuration, and magnetic loop operation, which are electronically selectable to optimize performance for different frequency ranges and applications.

The system learns from its history, using past data on performance and propagation conditions to adjust algorithms in its control circuitry.

The disclosure provides several significant advantages over prior art systems, including extended multi-band coverage, three-dimensional beam steering, adaptive operation, hybrid efficiency optimization, compact size, rapid reconfiguration, and environmental ruggedness.

TERMS AND DEFINITIONS

AM: Amplitude modulation; AM band is the frequency range of 535 kHz to 1705 kHz.

AWG: American wire gauge.

CAN: Controller area network. Refers to a standard two-wire data bus that allows electronic control units (ECUs) in vehicles and other systems to exchange data.

DC: Direct current.

DSP: Digital signal processing.

FR4: a widely used, low-cost PCB substrate for antenna systems, especially at lower frequencies.

GPS: Global positioning system.

kHz: Kilohertz

Litz wire: A type of wire optimized for RF, consisting of many thin wire strands, individually insulated and twisted or woven together, often involving several levels of bundling, in which already-twisted wires are twisted together into small bundles, which are then twisted into larger bundles.

MHz: Megahertz.

PC: Personal computer.

PCB: Printed circuit board.

PIN: A type of a diode with a wide, undoped intrinsic semiconductor region between a p-type semiconductor and an n-type semiconductor region, desirable for high-frequency switching applications.

α-N: A semiconductor junction between P-type and N-type doped material.

RF: Radio frequency.

SP4T: Single-pole, four-throw, referring to a single-conductor switch with four states or positions.

SP8T: Single-pole, eight-throw, referring to a single-conductor switch with eight states or positions.

SWR: Standing wave ratio: the ratio of transmitted to reflected power in an antenna or feedline.

USB: Universal standard bus.

VHF: Very High Frequency, comprising the frequencies from 30 to 300 MHz.

VSWR: Voltage standing wave radio.

BRIEF DESCRIPTION OF THE SEVERAL VIEWS OF THE DRAWINGS

To identify the discussion of any particular element or act easily, the most significant digit or digits in a reference number refer to the figure number in which that element is first introduced.

DETAILED DESCRIPTION

A hybrid multi-band antenna system. The system comprises a ferrite core divided into a plurality of axial ferrite segments, each segment comprising different ferrite materials optimized for specific frequency ranges. A hybrid conductor system includes both flat copper tape and Litz wire windings associated with the ferrite segments. Electronic switching means select between conductor types and selectively connect and disconnect individual ferrite segments. Variable capacitive elements are distributed along the windings for frequency tuning. A segmented cap hat system with electronically controllable diameter and asymmetry matches impedance and controls radiation patterns. Switchable parasitic elements provide three-dimensional beam steering with azimuthal and elevation control. Multi-mode operation includes electronic switching among segmented, folded monopole and magnetic loop configurations. The system offers automatic mode selection and performance optimization, and machine learning optimization for adaptive performance enhancement.

Overview

Figure 1:
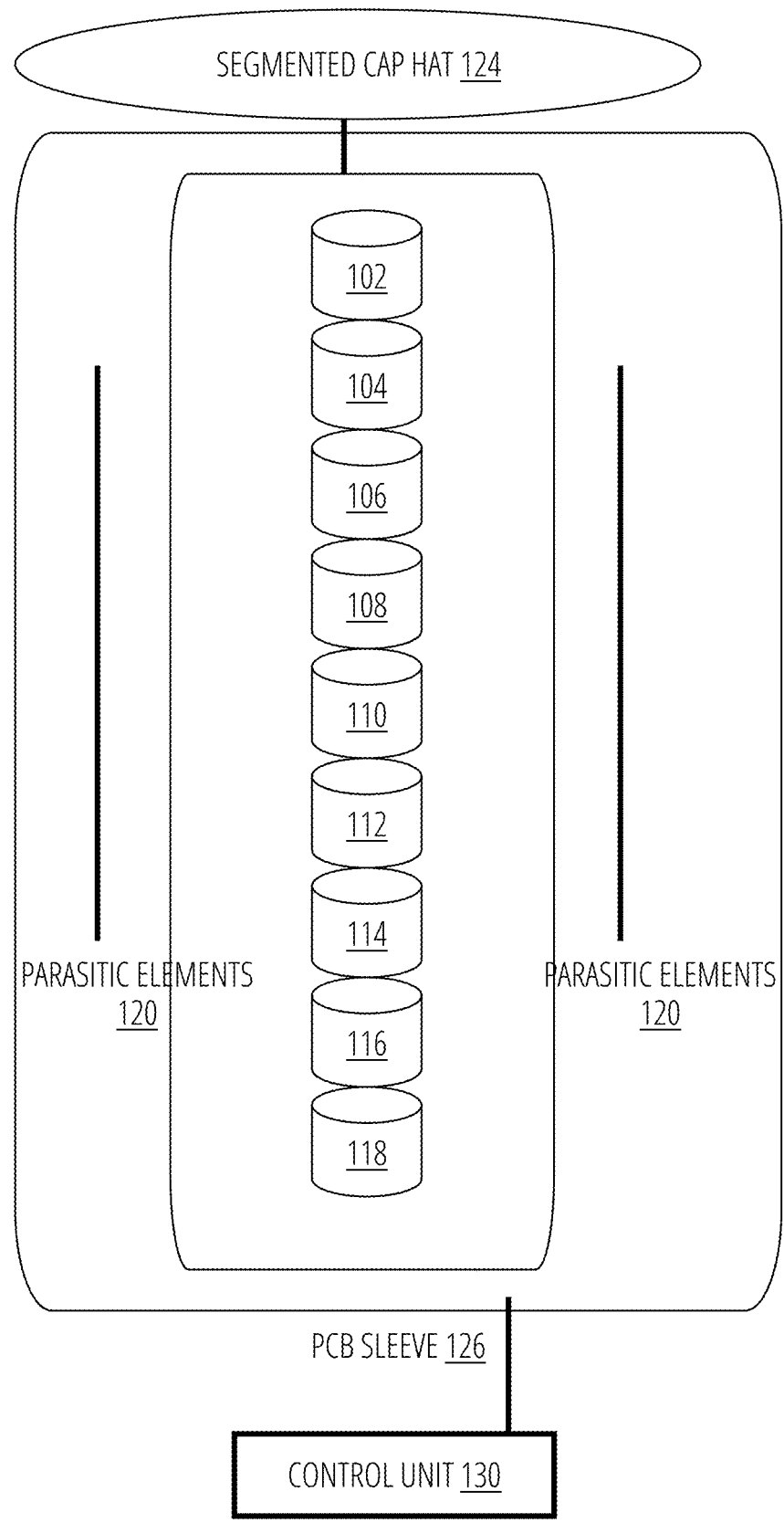
FIG. 1 is an overview of the system.

FIG. 1 is a comprehensive side view of the complete antenna system that shows all the major components and their spatial relationships. Nine ferrite segments and their associated windings (102-118) are arranged vertically. Four different ferrite material types are used in one embodiment- Type 61 ferrite for the low-frequency segments 102-106, Type 43 for the transition segments 108-110, Type 67 for segments 112-114, and Type 77 for the high-frequency segments 116-118.

The cylindrical PCB substrate is depicted as the outer rectangular boundary containing the ferrite assembly, with the parasitic elements shown as vertical black traces on the PCB surface (two of the eight elements are visible from this side view perspective).

The segmented cap hat system is illustrated at the top as an elliptical disk 124, while the control unit 130 is shown at the base with the connecting cable running up through the antenna structure.

Ferrite Core Segments

In one embodiment, the ferrite segments 102-114 measure 40 mm in length and ferrite segments 116 and 118 measure 35 mm in length, all with 30 mm diameter to accommodate enhanced conductor systems.

Ferrite Core Construction and Material Selection

In one embodiment, the ferrite segments 102-118 are constructed from different ferrite materials optimized for specific frequency ranges and operational modes. Segments 102-106 utilize Type 61 ferrite material having an initial permeability ($\mu_i$) of 125 and optimized for operation from 200 kHz to 8 MHz. These segments are specifically configured for low-frequency operation with flat copper tape conductors.

Segments 108 and 110 employ Type 43 ferrite material with $\mu_i$ of 850, suitable for frequencies from 20 kHz to 5 MHz but optimized for folded monopole operation in the 3-8 MHz range. The higher permeability of Type 61 material provides enhanced field concentration for improved efficiency in folded configurations.

Segments 112 and 114 utilize Type 67 ferrite material with $\mu_i$ of 40, optimized for 1-30 MHz operation to extend high-frequency performance. The lower permeability reduces losses at higher frequencies while maintaining sufficient field enhancement.

Segments 116 and 118 employ Type 77 ferrite material with $\mu_i$ of 20, specifically designed for VHF operation up to 54 MHz. These segments enable 6-meter band coverage while minimizing core losses at the highest operational frequencies.

Conductor Windings

Figure 2:
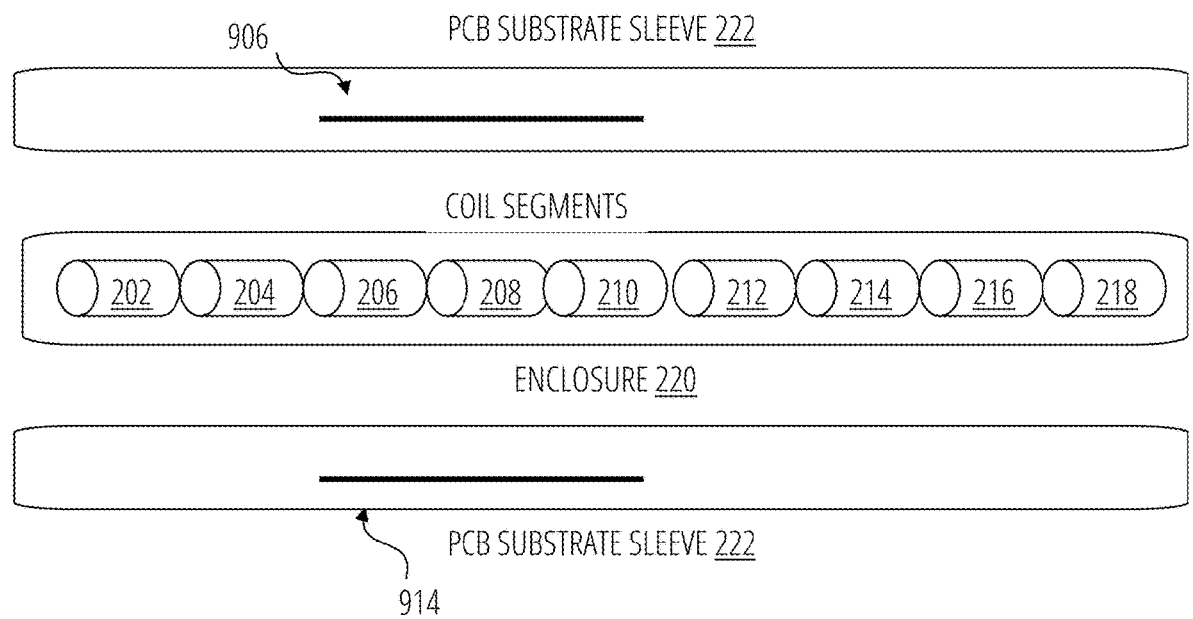
FIG. 2 provides a side view of the segmented ferrite coils and their associated parasitic elements.
Figure 9:
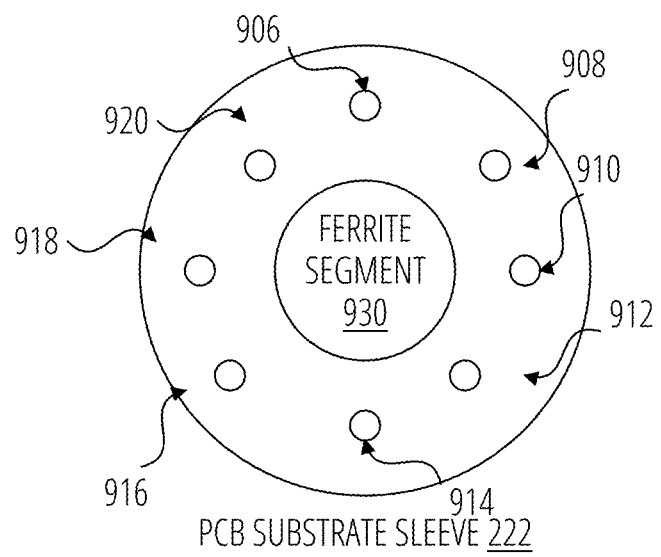
FIG. 9 is a cross-sectional view of the parasitic elements and their substrate surrounding the ferrite core.

FIG. 2 depicts the adaptive multi-band ferrite helix array, a hybrid conductor system showing coil segments 202, 204, 206, 208, 210, 212, 214, 216, and 218, an enclosure 220, a PCB substrate sleeve 222, a first parasitic element 906, and a fifth parasitic element 914. The system comprises eight parasitic elements, as shown in FIG. 9 but only the first and fifth are shown in this FIG. 2. FIGS. 2 and 202-218 represent the ferrite segments with their associated coil windings. FIGS. 1 and 102-118 represent the ferrite segments without coil windings.

The winding system comprises a plurality of coil segments, one for each ferrite segment, using a hybrid conductor approach that utilizes both flat copper tape and Litz wire conductors, with electronic switching means to select optimal conductor types based on operational frequency and efficiency requirements.

Each ferrite segment incorporates a hybrid conductor system enabling electronic selection between different conductor types optimized for specific frequency ranges and operational modes.

Flat Tape Conductor System

Segments 202-210 include flat copper tape conductors, e.g. 306, measuring 12 mm width by 0.1 mm thickness. The flat tape configuration provides several advantages:

1. Reduced Skin Effect: The wide, thin geometry minimizes RF resistance at HF frequencies 2. Enhanced Current Distribution: Uniform current flow improves radiation efficiency 3. Increased Capacitance: Higher inter-turn capacitance aids in impedance matching 4. Mechanical Stability: Flat tape maintains precise spacing and geometry The flat tape is wound with variable pitch: segments 202-206 have 35 turns each with pitch varying from 0.8 mm to 1.2 mm along the segment length to optimize field distribution.

Figure 3A:
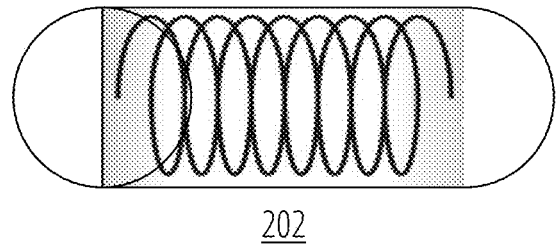
FIG. 3A illustrates flat tape windings around a ferrite segment.

The flat copper tape windings, measuring 12 mm wide by 0.1 mm thick, are wound helically around ferrite segments 102 through segment 110 with segments 102, 104, and 106 having only the flat tape conductor as their sole winding system, FIG. 3A illustrates one of the low frequency ferrite segments, 202, with its flat tape winding 306.

Litz Wire Conductor System

Segments 208-218 include Litz wire conductors using 18 AWG Litz wire comprising 165 strands of 46 AWG wire. The Litz wire system provides:

1. Minimized Proximity Effect: Individual strand isolation reduces inter-conductor losses 2. High-Frequency Optimization: Effective operation up to 54 MHz 3. Flexibility: Accommodates folded and loop configurations 4. Reliability: Proven technology with established manufacturing processes. The flat copper tape and Litz wire conductors are distributed across the nine ferrite segments configuration that optimizes performance across the complete frequency range while providing smooth transitions between different operational modes.

Figure 3B:
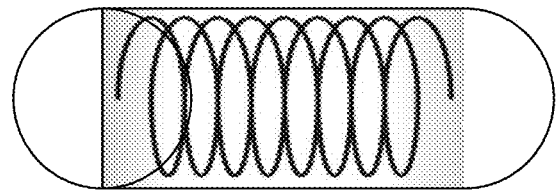
FIG. 3B illustrates Litz wire windings around a ferrite segment.

5. FIG. 3B illustrates one of the high-frequency ferrite segments, 218, with its Litz wire winding 308.

The Litz wire system begins at segment 208 and extends through segment 218, comprising 18 AWG wire constructed from 165 individual strands of 46 AWG wire, with segments 208 and coil segment 210 contain both conductor types while segments 212, 214, 216, and 218 have only Litz wire windings as their conductor system.

Segments 208 and 210 feature both the flat tape and Litz wire windings wound on the same ferrite cores to create dual-conductor segments.

Figure 3C:
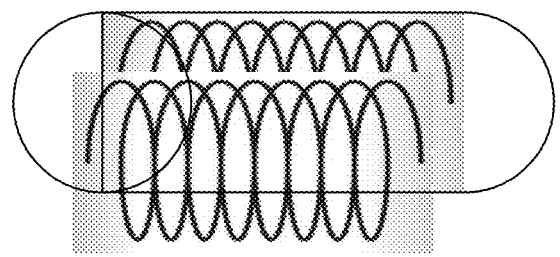
FIG. 3C illustrates combined flat-tape and Litz windings around the same ferrite segment.

FIG. 3C depicts segment 210, with overlapping flat tape 306, and Litz wire windings 308.

This winding architecture creates three distinct zones of conductor optimization while enabling smooth transitions and hybrid operational modes that would be impossible with a simple single-conductor-per-segment approach. The flat-tape-only segments (202-206) are optimized for low-frequency operation where the wide, thin geometry of the copper tape minimizes skin effect losses and provides enhanced current distribution that improves radiation efficiency in the 1.6-5 MHz range where the antenna's electrical length is much shorter than the operating wavelength. The dual-conductor segments (208-210) serve as transition zones where the control system can electronically select between flat tape and Litz wire based on frequency, operational mode, and performance requirements selected by the user, enabling sophisticated hybrid modes where some segments operate with flat tape while others use Litz wire simultaneously, and supporting folded monopole configurations where the electrical path may traverse both conductor types to optimize current distribution. The Litz-wire-only segments (212-218) are optimized for high-frequency operation where proximity effect between adjacent turns becomes the dominant loss mechanism, and the individually insulated strands of the Litz construction prevent circulating currents while maintaining effective cross-sectional area for current flow, enabling efficient operation up to 54 MHz where conventional solid conductors would suffer significant losses.

The electronic selection between conductor types within the dual-conductor segments is accomplished through dedicated PIN diodes, shown in FIG. 8, that can connect either the flat tape or Litz wire winding to the RF system while isolating the unused conductor, allowing the control algorithm automatically to choose the optimal conductor based on frequency-dependent loss characteristics, with flat tape typically selected below 5 MHz where skin effect dominates, Litz wire chosen above 15 MHz where proximity effect becomes important, and intelligent hybrid selection in the 5-15 MHz transition zone based on specific operational modes and real-time performance feedback. This sophisticated conductor architecture enables the antenna to maintain optimal efficiency across its entire 1.6-54 MHz operational range by utilizing the conductor type best suited for each frequency and operational condition, something that would be impossible with any single conductor compromise solution attempting to cover such an extreme frequency span with acceptable performance.

Electronic Switching Network

Figure 4:
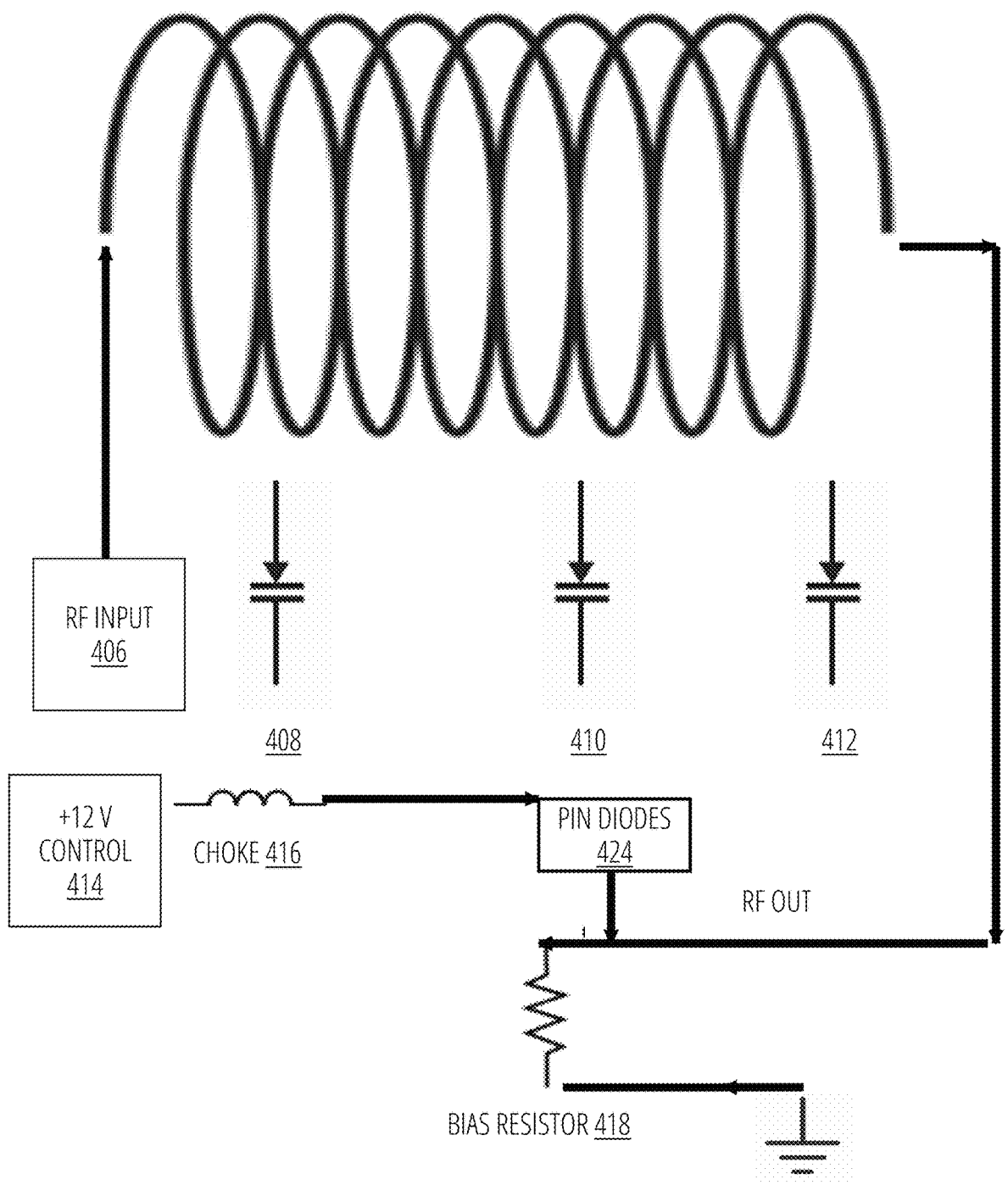
FIG. 4 is a schematic diagram of the electronic switching and tuning network for one segment.

FIG. 4 illustrates how electronic switching networks are connected to each coil segment. Only coil segment 202 and its associated switching network is shown, but an identical switching network is associated with each of the plurality of coil segments. The switching network comprises a coil segment 202, an RF input 406, varactors 408, 410, and 412, a +12 v control 414, a choke 416, a bias resistor 418, a ground 420, and multiple PIN diodes 424 for different functions:

1. Segment Activation: PIN diode 810 controls segment connection
2. Conductor Selection: PIN diode 818 selects between flat tape 806 and Litz wire 804
3. Mode Configuration: PIN diode 814 enables folded or loop operation
4. Tap Selection: PIN diode 812 selects optimal tap points for frequency optimization The bias network includes individual RF chokes (10 μH each) (416 is shown) and bias resistors (47kΩ each) (418 is shown) for independent control of each switching function. Control voltages range from 0-15V DC for PIN diode activation.

Each segment-select PIN diode (collectively shown as 424) controls whether its individual ferrite segment (with its coil) is electrically connected to the antenna system or completely disconnected.

When a segment-select PIN Diode is on (forward biased), its segment coil is electrically connected to RF system allowing current to flow through that segment's coil and contribute to the antenna's electrical length and resonance. That affects radiation pattern and efficiency When a segment-select PIN Diode is off (reverse/zero biased), its segment is electrically isolated, with more than 10kΩ impedance. No current flows through that segment, and it is effectively "removed from the antenna. It does not contribute to the antenna's electrical length.

For example, for low frequency operation (1.6-5 MHz), coil segments 202, 204, 206, 208, and 210, all are on for maximum electrical length, while coil segments 212, 214, 216, and 218 are off to prevent parasitic resonances.

For low-mid frequency operation (5-8 MHZ), coil segments 202-208 all are on, while coil segments 210 to 218 are off to prevent over-lengthening.

For mid-frequency operation, coil segments 206, 208, 210, and 212, are on, while coil segments 202, 204, 214, 216, and 218 are off to optimize the combination of ferrite type and conductor type.

For high-mid frequency operation, Litz wire coil segments 210, 212, 214 are on, while coil segments 202, 204, 206, 208, 216, and 218 are off.

For high frequency operation (20-54 MHZ), only the high-frequency optimized segments 216, and 218 are on, while segments 202, 204, 206, 208, 210, 212, and 214 are off to minimize electrical length. Type 67 and 77 ferrite have lower losses at VHF. Types 61/43 ferrite become very lossy above 15 MHz.

The segment-select PIN diodes make this automatic reconfiguration possible, switching segments on/off in milliseconds based on frequency, performance requirements selected by the user, and user commands. Without this electronic switching, the system would need multiple separate antennas to cover the same frequency range and capabilities.

Multiple PIN diodes exist per segment, with each segment incorporating four distinct PIN diodes that serve different switching functions to enable the sophisticated reconfiguration capabilities. Each segment contains a segment-select PIN diode (810 is shown) for basic segment activation (connecting or disconnecting the entire segment from the RF system), conductor-select PIN diode (818 is shown) for conductor type selection (switching between flat copper tape and Litz wire in segments that have both conductor types), configuration PIN diode (814 is shown) for operational mode configuration (enabling folded monopole, magnetic loop, or segmented operation by creating different connection paths), and tap-select PIN diode (812 is shown) for tap point selection (connecting to optimal impedance points along the coil for different frequencies and modes).

The segment activation PIN diode (810) serves as the primary architectural control, providing the fundamental ON/OFF switching that determines whether each ferrite section contributes to the antenna's electrical length, while the conductor selection PIN diode (818) operates only in the dual-conductor segments (208 and 210) to choose between flat tape and Litz wire based on frequency-dependent optimization requirements. The mode configuration PIN diode (814) enables the complex interconnections necessary for folded monopole operation (where segments are connected in series to create enhanced current distribution) versus segmented operation (where each segment operates independently) and also facilitates magnetic loop configurations where segments are connected to form closed-loop current paths. The tap selection PIN diode (812) provides fine-tuned impedance matching by connecting to different points along each coil's length, effectively changing the number of active turns and optimizing the impedance transformation ratio for different frequencies and operational modes. This four-PIN-diode-per-segment architecture, totaling 36 PIN diodes across the nine segments, creates an extremely flexible switching matrix that allows the antenna to reconfigure not just which segments are active, but how they are interconnected, which conductor type is used, and where the optimal electrical connections are made within each segment's coil structure.

Advanced Control System Architecture

The system has control circuitry comprising hardware and software logic controlling connection of the ferrite segments, connection of the flat copper tape and Litz wire windings, operation of the variable capacitive elements, the diameter and asymmetry of the cap hat system, switching the parasitic elements, and switching among the segmented, folded monopole and magnetic loop configurations.

Figure 5:
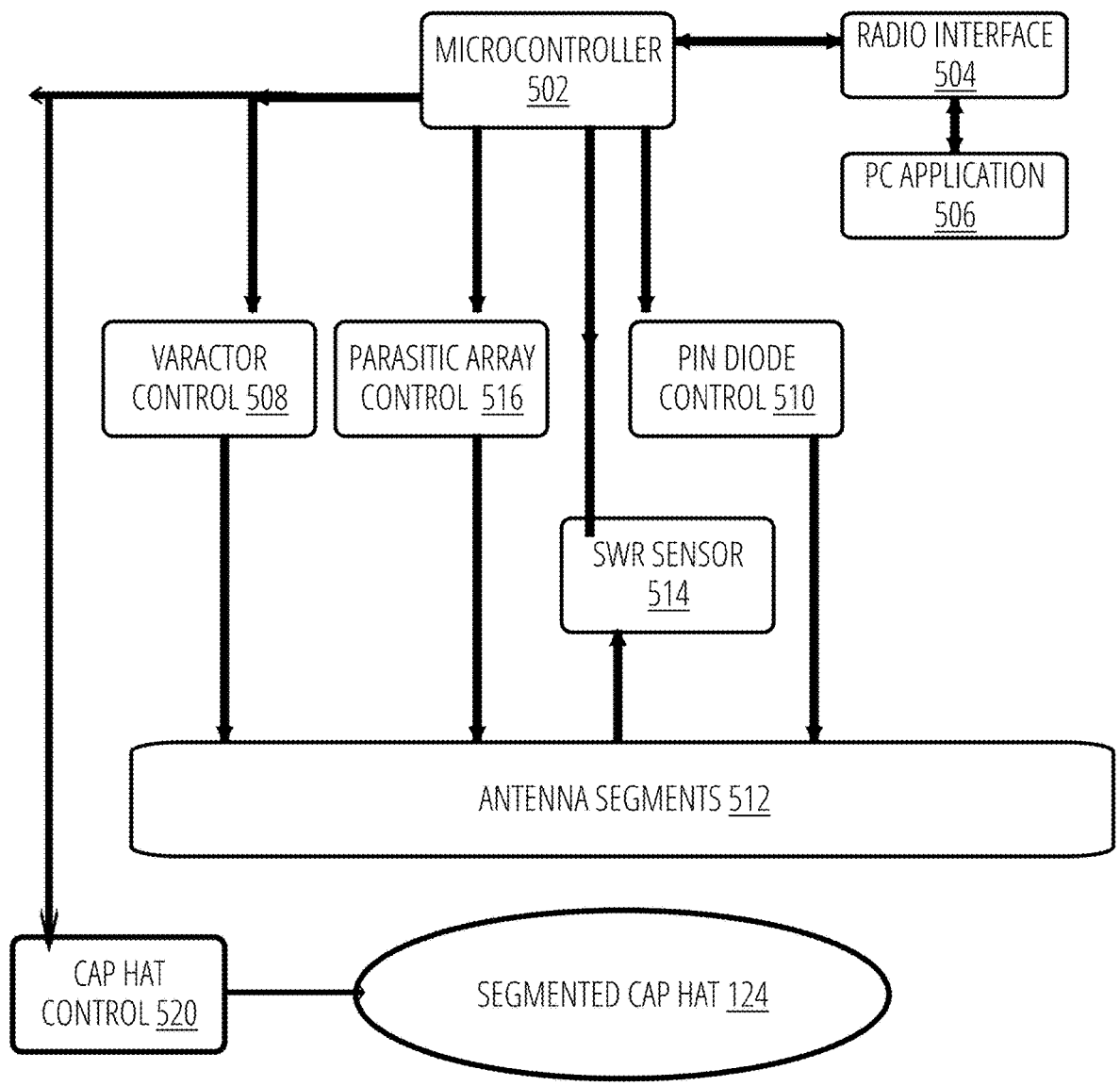
FIG. 5 is a block diagram of the complete control system including microcontroller, multi-mode switching, and user interface.

FIG. 5 depicts the control system architecture, which comprises a microcontroller 502, a radio interface 504, a PC application 506, a varactor control 508, a PIN diode control 510, antenna segments 512, segmented cap hat 124, an SWR sensor 514, a parasitic array control 516, and a cap hat control 520, collectively referred to as "control circuitry." The antenna segments 512 comprise ferrite cores 102-118 and their associated windings.

System parameters comprise VSWR levels, varactor state, varactor voltage, PIN diode state, PIN diode voltage and current level, and switch state.

The varactor control 508 comprises multiple digital-to-analog converters for varactor bias control. The PIN diode control 510 activates and controls PIN diodes. The parasitic array control 516 configures the parasitic elements. The SWR sensor 514 feeds back information about standing wave ratio to inform antenna adjustment.

The control system provides DSP functions, such as real-time impedance analysis and optimization; machine learning for adaptive pattern recognition for optimal configurations; anticipatory frequency and pattern adjustments; and multi-parameter adjustment by simultaneous optimization of all control variables.

External control is provided to a PC through USB 3.0 for high-speed configuration and monitoring; Ethernet, enabling network integration for remote operation; CAN Bus for integration with larger communication systems; and analog control for compatibility with legacy equipment.

10K non-volatile memory is provided with GPS/time tagging

The control system simultaneously optimizes segment selection, active/inactive status for each segment; conductor type, flat tape or Litz wire selection; segmented, folded, or loop configuration; varactor settings of up to 45 independent bias voltages; cap hat diameter and asymmetry settings; and activation of parasitic Elements for pattern control and null steering. Automatic optimization includes real-time impedance monitoring, pattern analysis, and adaptive implementation of well-known algorithms derived from radio antenna theory. The control system continuously monitors and adapts system parameters for optimal performance.

Figure 6:
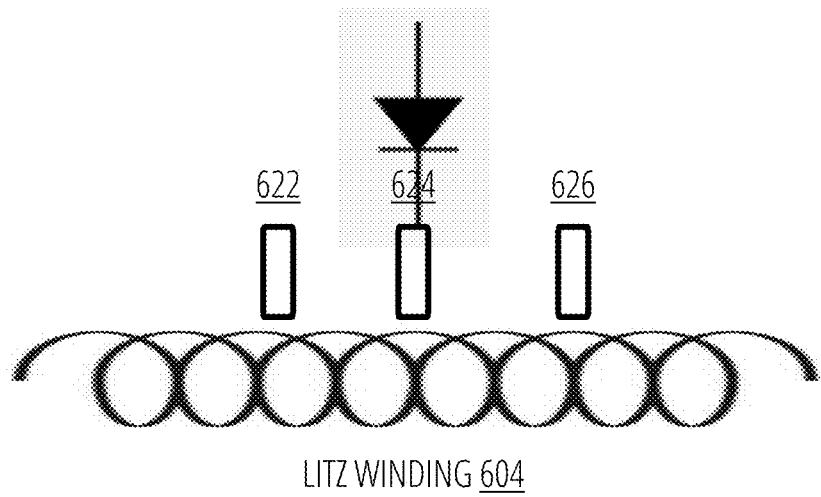
FIG. 6 illustrates the placement of PIN diode taps.

FIG. 6 depicts a Litz winding 604, its PIN diode tap select 612, and taps at 25% 622, 50% 624, and 75% 626. Similar taps are placed on flat tape windings, where they exist.

Advanced Varactor Tuning System

Variable capacitive elements comprise up to five varactor diodes per segment positioned at distributed locations along each winding.

Varactor diodes in this antenna system are voltage-controlled capacitors that do not automatically respond to frequency changes on their own, but instead undergo active control from the sophisticated electronic control system to function. When a frequency change occurs, the microcontroller detects this change through external commands from the radio or user interface, then calculates the precise capacitance values needed for each of the 45 varactors distributed throughout the antenna segments to achieve optimal resonance and impedance matching at the new frequency. The control system then commands the digital-to-analog converters to output specific bias voltages (ranging from 0 to −30V) to each varactor, which causes them to assume new capacitance values according to the voltage-capacitance relationship of the reverse-biased P-N junction within each device. This change in capacitance directly affects the electrical length and resonant frequency of each antenna segment, allowing the entire system to retune from one frequency to another in less than two seconds.

Figure 7:
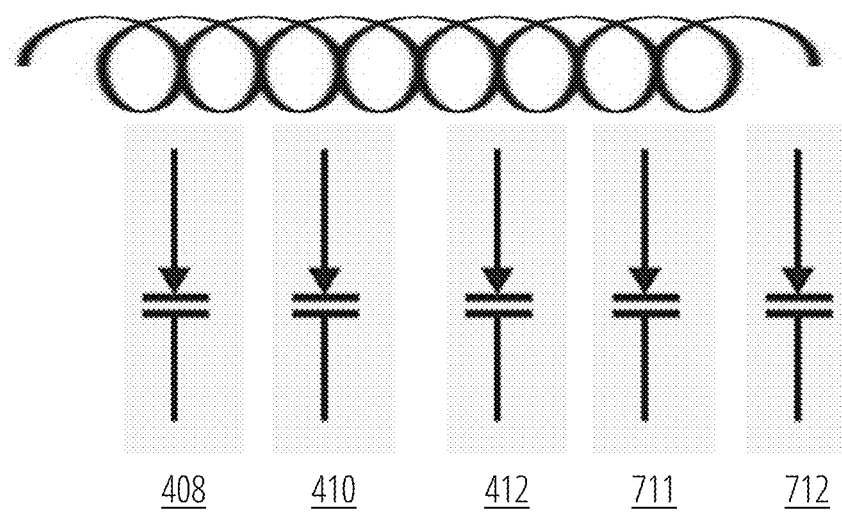
FIG. 7 is a detailed view of the varactor placement within a helical coil segment.

As shown in FIG. 7, each coil segment (segment 202 is shown) incorporates an enhanced varactor system with up to five varactor diodes per segment, for example, 408, 410, 412, 711, and 712 positioned at 20%, 40%, 60%, 80%, and 100% of the winding length of Litz winding 604 around segment 104. The varactor diodes provide capacitance ranges from 0.65 pF to 15 pF depending on the applied reverse bias voltage (0-40V).

The varactors are connected in parallel across portions of the coil, not in series with the coil conductors. Each varactor connects between a specific tap point along the coil and a common ground reference, creating distributed parallel capacitance rather than interrupting the main RF current path through the helical winding.

This distributed approach provides:

Fine Frequency Resolution: 1 kHz tuning steps across all bands

Multiple Resonance Control: Independent tuning of different modes

Harmonic Suppression: Distributed tuning reduces spurious resonances

Enhanced Bandwidth: Multiple tuning points increase usable bandwidth.

Both PIN diodes and varactor diodes are essential because they serve fundamentally different and complementary functions that cannot be achieved by either technology alone. PIN diodes function as RF switches that provide binary ON/OFF control with extreme impedance differences-either presenting less than 1 ohm resistance when forward-biased (fully connecting a segment to the RF system) or greater than 10,000 ohms when reverse-biased (completely isolating a segment from the RF path)—making them ideal for architectural decisions such as selecting which ferrite segments are active, choosing between flat tape or Litz wire conductors, and configuring the antenna for different operational modes like segmented, folded monopole, or magnetic loop operation. In contrast, varactor diodes provide continuously variable capacitance over a 15:1 range, allowing precise analog control for fine-tuning the resonant frequency, achieving impedance matching, creating progressive phase shifts for beam steering, and suppressing harmonics within whatever antenna architecture the PIN diodes have established. The PIN diodes essentially determine the "coarse structure" of the antenna—deciding its basic electrical configuration and which elements participate in radiation—while the varactors provide the "fine control" needed to optimize performance within that structure, handling tasks requiring precise analog adjustment rather than simple on/off switching. Neither technology alone could achieve the system's full capabilities: PIN diodes without varactors could reconfigure the antenna architecture but couldn't provide the continuous tuning needed for impedance matching across frequency ranges, while varactors without PIN diodes could tune within a fixed configuration but could not change the fundamental antenna structure, prevent parasitic resonances from unused segments, or switch between different operational modes, making both technologies indispensable for creating a truly adaptive, multi-mode antenna system.

Electronic Conductor Selection

The dual-conductor segments, 208 and 210 include conductor select PIN diodes (conductor-select PIN diode 818 is illustrated) capable of switching up to 100 W RF power. The selection logic operates based on:

Frequency<5 MHz: Flat tape selected (optimized skin depth)

5 MHz<Frequency<15 MHz: Conductor type selected based on mode

Frequency>15 MHz: Litz wire selected (proximity effect dominant)

Figure 8:
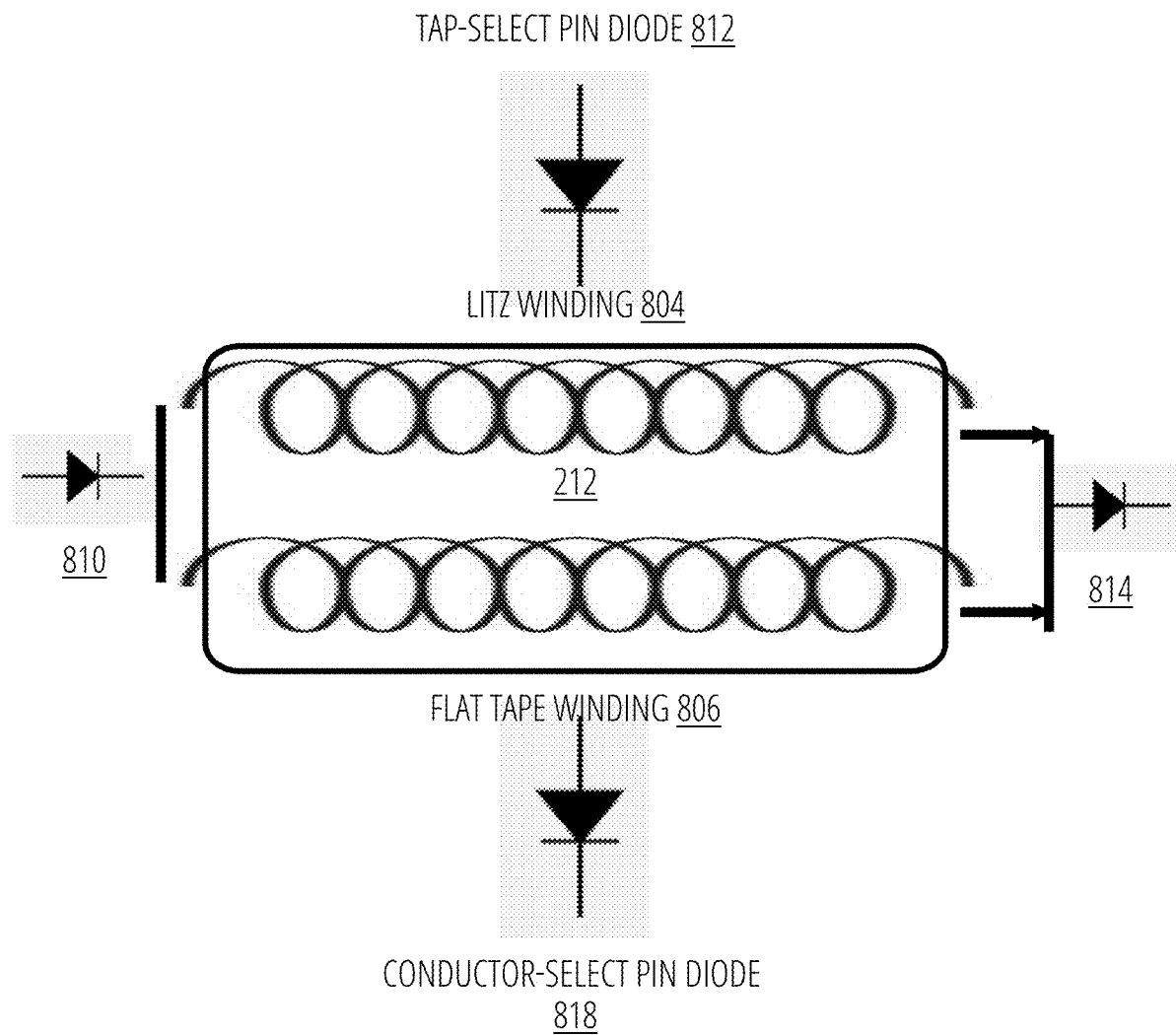
FIG. 8 illustrates PIN diodes arranged to switch between flat tape and Litz wire windings.

FIG. 8 depicts the arrangement of the pin diodes on one ferrite segment. Ferrite segments 108 and 110 have both a Litz winding 804, a flat tape winding 806, a segment-select on/off pin diode 810, a tap select pin diode 812, a configuration pin diode 814, and a conductor select pin diode 816. The tap-select PIN diode 612 is a one-bit diode with two states: on or off. The configuration pin diode 814 is a two-bit diode with four states. The conductor-select PIN diode 818 is a one-bit diode with two states: Litz or flat-tape. The tap-select PIN diode 612 is a two-bit diode with four states, one for each tap.

The following summarizes the operation of segment-select PIN diodes and conductor-select PIN diodes:

Segment 202: segment-select PIN diode 810 (activation), no conductor-select PIN diode (flat tape only)

Segment 204: segment-select PIN diode (not shown; identical to 810) (activation), no conductor-select PIN diode needed (flat tape only)

Segment 206: segment-select PIN diode (not shown; identical to 810) (activation), no conductor-select PIN diode needed (flat tape only)

Segment 208: segment-select PIN diode (not shown; identical to 810) (activation), no conductor-select PIN diode needed (flat tape only)

Segment 210: segment-select PIN diode (not shown; identical to 810) (activation), conductor-select PIN diode 818

Segment coil segment 212: segment-select PIN diode (not shown; identical to 810) (activation), conductor-select PIN diode (not shown)

Segment 214: segment-select PIN diode (not shown; identical to 810) (activation), no conductor-select PIN diode needed (Litz wire only)

Segment 216: segment-select PIN diode (not shown; identical to 810) (activation), no conductor-select PIN diode needed (Litz wire only)

Segment 218: segment-select PIN diode (not shown; identical to 810) (activation), no conductor-select PIN diode needed (Litz wire only)

Segment enclosure 220: segment-select PIN diode (not shown; identical to 810) (activation), no conductor-select PIN diode needed (Litz wire only)

Parasitic Elements

FIG. 9 depicts the parasitic elements of the system, comprising one of the ferrite segments and its associated coils 930, a PCB substrate sleeve 222, a first parasitic element 906, a second parasitic element 908, a third parasitic element 910, a fourth parasitic element 912, a fifth parasitic element 914, a sixth parasitic element 916, a seventh parasitic element 918, and an eighth parasitic element 920.

The eight parasitic elements are vertical copper traces that run parallel to the antenna's main axis (the same direction as the 280 mm length of the ferrite core assembly). Each trace is fabricated on the cylindrical PCB substrate that surrounds the ferrite core like a sleeve, with the traces running longitudinally along the antenna's length at eight different circumferential positions spaced 45° apart around the cylinder.

The eight parasitic elements are arranged as a circular array around the antenna's midsection, with all eight copper traces spanning the identical 120 mm axial length that covers the same three ferrite segments (typically segments 16c, 16d, and 16e), but positioned at different circumferential locations around the cylindrical PCB substrate. Rather than having different parasitic elements cover different axial sections of the antenna, each of the eight traces (906 through 920) runs parallel to the antenna's main axis along the same longitudinal section, but separated by 45-degree increments around the circumference-creating positions at 0°, 45°, 90°, 135°, 180°, 225°, 270°, and 315° when viewed from either end of the antenna. This configuration essentially creates an eight-element circular parasitic array surrounding the middle section of the main ferrite antenna, where all elements are equidistant from the central radiating structure and positioned to provide complete 360-degree azimuthal coverage.

This arrangement allows effective beam steering because having all parasitic elements at the same axial location allows them to work together coherently to shape the radiation pattern in the horizontal plane without creating unwanted interference or pattern distortions that would occur if the elements were distributed along different sections of the antenna's length. When the control system selectively activates different combinations of these eight circumferentially-distributed elements through their individual SP4T switches, it can create constructive and destructive interference patterns that steer the main beam in any azimuthal direction, create deep nulls for interference rejection, or generate complex radiation patterns such as cardioid, figure-8, or highly directional beams. The fact that each parasitic element can be independently controlled with variable electrical length (through the SP4T switches) while maintaining the same axial positioning relative to the main antenna provides the sophisticated pattern control capabilities that enable precise beam steering, null placement, and gain optimization across the complete azimuthal plane.

These parasitic elements comprise eight copper traces etched onto a 0.8 mm thick FR4 PCB substrate, with each trace measuring 2 mm in width and 120 mm in length (spanning three ferrite segments), positioned at precisely 45-degree intervals around the circumference to provide complete azimuthal coverage-essentially creating eight "virtual antenna elements" surrounding the main ferrite antenna at positions corresponding to 0°, 45°, 90°, 135°, 180°, 225°, 270°, and 315° around the circular cross-section. The parasitic elements run parallel to the main axis on the outer cylindrical PCB surface that surrounds the ferrite segments and their coil segments.

This axial positioning is crucial for their operation because they need to be parallel to the current flow in the helical coils to achieve proper electromagnetic coupling. If they were positioned radially (sticking out perpendicular to the cylinder), they would couple poorly with the predominantly axial current distribution in the helical windings and would be much less effective at influencing the radiation pattern.

The parasitic elements operate through electromagnetic coupling with the main antenna's near-field radiation, where each copper trace acts as a resonant element that can either be electrically connected (active) or disconnected (inactive) via SP4T electronic switches, allowing the control system to energize specific traces selectively to create constructive or destructive interference patterns that shape the overall radiation pattern. When a parasitic element is switched ON and properly phased, it re-radiates energy that combines with the main antenna's radiation to create directional patterns, nulls, or enhanced gain in specific directions—for example, activating traces 906 and 914 (opposite each other at 0° and 180°) creates a cardioid pattern with enhanced radiation toward one side and a null toward the other, while activating traces 910 and 918 (at 90° and) 270° creates a figure-8 pattern with nulls at the front and back.

The system can create complex three-dimensional beam steering by combining parasitic element switching with the phase control provided by the varactor-tuned ferrite segments, where the ferrite segments and their windings provide the main radiation and phase relationships while the parasitic elements sculpt and direct that energy into specific spatial patterns. This approach is particularly effective because the parasitic elements are positioned in the reactive near-field region of the main antenna (within about ⅙ wavelength at HF frequencies), where strong electromagnetic coupling occurs, allowing relatively low-power parasitic currents to influence the far-field radiation pattern through constructive and destructive interference effects that redirect the antenna's energy without requiring separate feed networks or complex phasing systems for each parasitic element.

The antenna system employs eight SP4T (Single Pole, 4 Throw) switches, with one dedicated switch controlling the effective length of each of the eight parasitic copper traces that run axially along the cylindrical PCB substrate surrounding the ferrite core assembly. Each SP4T switch provides four distinct connection states for its associated 120 mm parasitic trace: completely OFF with no ground connection, connected at the 40 mm tap point for short-length operation, connected at the 80 mm tap point for medium-length coupling, or connected at the full 120 mm length for maximum electromagnetic interaction with the main antenna. This variable-length control allows each parasitic element to provide different levels of coupling strength and phase relationships depending on the desired radiation pattern, enabling the creation of sophisticated directional patterns, precise null steering for interference rejection, and fine beam steering control with 3-10-degree resolution across the full 360-degree azimuthal range. These switches are located in the cylindrical PCB substrate around the antenna's mid-section.

The three switching technologies in this antenna system serve distinctly different but complementary functions that work together to create unprecedented control capability. PIN diodes function as architectural switches that make fundamental decisions about the antenna's basic structure-determining which ferrite segments are electrically active, selecting between flat tape or Litz wire conductors, and configuring the overall operational mode such as segmented operation, folded monopole, or magnetic loop configuration-essentially providing the binary ON/OFF control that defines the antenna's gross electrical characteristics. Varactor diodes provide continuous analog control within whatever architecture the PIN diodes have established, offering precise capacitance adjustment over a 15:1 range to achieve resonant frequency tuning, impedance matching, progressive phase control for beam steering, and harmonic suppression through their voltage-controlled capacitance that changes the electrical length and resonant properties of each segment. The SP4T switches complete this control hierarchy by providing intermediate-level pattern control through variable-length parasitic element activation, allowing the radiation pattern to be sculpted and directed without changing the fundamental antenna architecture or the fine-tuned electrical characteristics, creating a three-tier control system where PIN diodes establish the foundation, varactors optimize the electrical performance, and SP4T switches shape the spatial radiation characteristics to achieve the complete adaptive antenna system's capabilities.

Cap Hat System

Figure 10A:
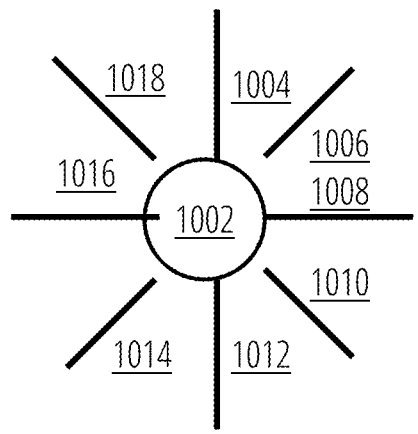
FIG. 10A is plan view of the capacity hat.

FIG. 10A is a plan view of the segmented cap hat system 124 positioned at the top of the antenna assembly. The cap hat consists of a hub 1002 and eight independently controllable copper segments 1004, 1006, 1008, 1010, 1012, 1014, 1016, and 1018 arranged in a circular pattern with electronic diameter adjustment from 45 mm to 200 mm.

Figure 10B:
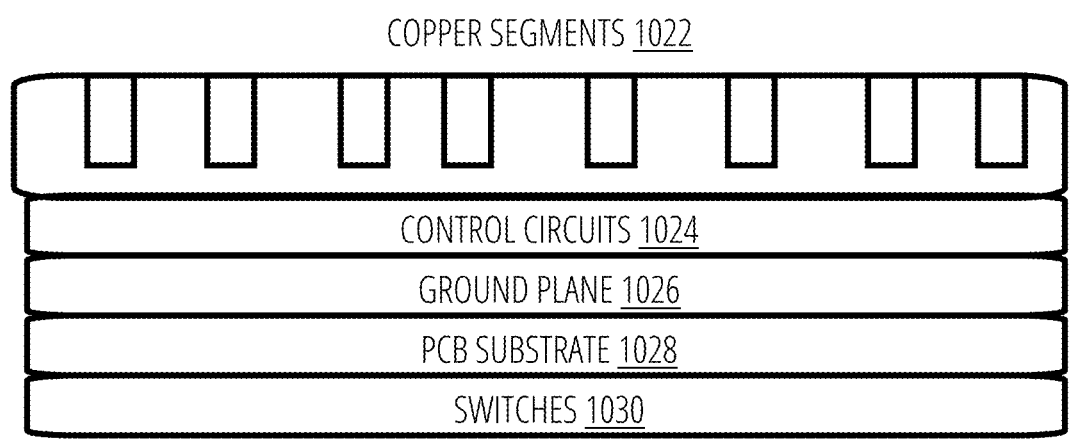
FIG. 10B is a side view of the capacity hat.
Figure 11:
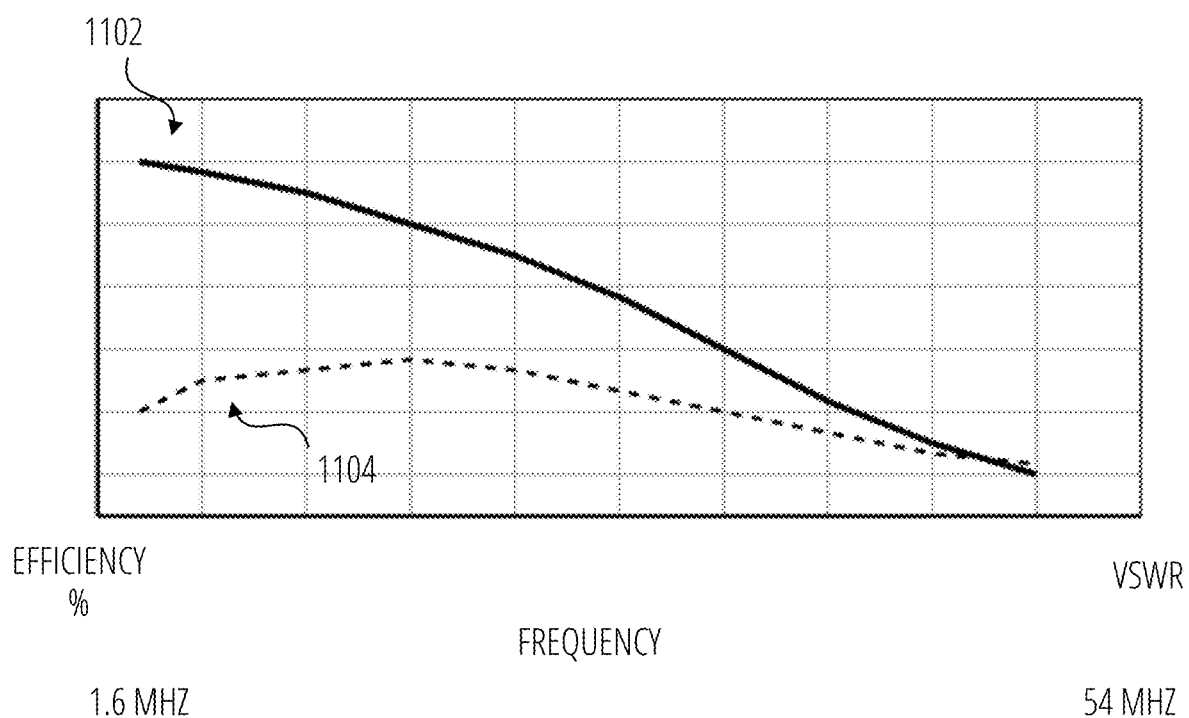
FIG. 11 shows frequency response and efficiency.

FIG. 10B is a side view of the top hat system with its copper segments 1022

(representing 1004, 1006, 1008, 1010, 1012, 1014, 1016, and 1018) in a first layer, control circuits 1024 in a second layer, a ground plane 1026 in a third layer, a PCB substrate 1028 in a fourth layer, and switches 1030 in a fifth layer.

The segmented cap hat provides additional beam steering capabilities:

Elevation Control: Asymmetric loading creates elevation pattern tilting

Azimuthal Nulling: Selective segment deactivation creates pattern nulls

Impedance Optimization: Variable loading improves matching across frequency ranges Harmonic Suppression: Segment phasing reduces harmonic radiation.

The cap hat system functions as an electronically controllable top loading mechanism that addresses the fundamental challenge of achieving acceptable impedance characteristics and radiation efficiency from a severely miniaturized HF antenna. When an antenna is physically much shorter than the operating wavelength—as this 280 mm antenna is compared to the 40+meter wavelengths at low HF frequencies—it presents extremely high capacitive reactance (thousands of ohms), very low radiation resistance (often less than 1 ohm), and consequently poor radiation efficiency and difficult impedance matching. The cap hat works by providing a large conductive surface at the current maximum point of the antenna (the top), which increases the antenna's effective electrical size, improves current distribution by providing a larger area for displacement currents, and significantly increases the radiation resistance while reducing the reactive component of the impedance to create a more manageable match to 50-ohm transmission systems.

The segmented electronic control of the cap hat is essential because different frequencies and operational modes need dramatically different amounts of capacitive loading for optimal performance. At low frequencies where the antenna is most severely electrically short, maximum cap hat diameter (200 mm with all eight segments active) provides the substantial top loading needed to achieve reasonable radiation resistance and efficiency, while at higher frequencies where the antenna approaches more reasonable electrical lengths, smaller cap hat configurations (45-90 mm diameter) prevent over-loading that would create poor impedance matches and reduced bandwidth. The eight independently switchable segments, controlled by SP4T switches that can connect different portions of each radial element, enable the system to vary the effective capacitive loading electronically from minimum to maximum in discrete steps, allowing real-time optimization based on SWR feedback and automatic adjustment as the antenna changes frequency or operational mode. Additionally, the asymmetric activation of cap hat segments—where some segments are active while others on the opposite side are disabled-creates deliberate imbalances in the current distribution that tilt the elevation pattern of the antenna, providing the elevation beam steering capability that complements the azimuthal steering achieved through the parasitic elements and segment phase control, thus enabling true three-dimensional beam steering from a single compact antenna structure.

The cap hat is capable of multiple configurations:
  Minimum Configuration (45 mm): Center segments only– high frequency optimization
  Medium Configuration (120 mm): Inner+middle segments–mid-band operation
  Maximum Configuration (200 mm): All segments–low frequency enhancement SP8T switches control segment connectivity with switching speeds <10 µs.

The eight SP4T switches 1030 are located in the cap hat assembly at the top of the antenna. Each of the 8 radial cap hat segments has its own SP4T switch, with four possible states: OFF, short radius (45 mm), medium radius (120 mm), full radius (200 mm). These switches control the effective diameter and asymmetry of the top loading disk, thus matching impedance and controlling elevation pattern.

Frequency Response and Efficiency

FIG. 13 shows frequency response and efficiency. A solid line represents efficiency 1102 response and a dashed line shows VSWR 1104 response across frequency.

Emission Pattern Control

Figure 12:
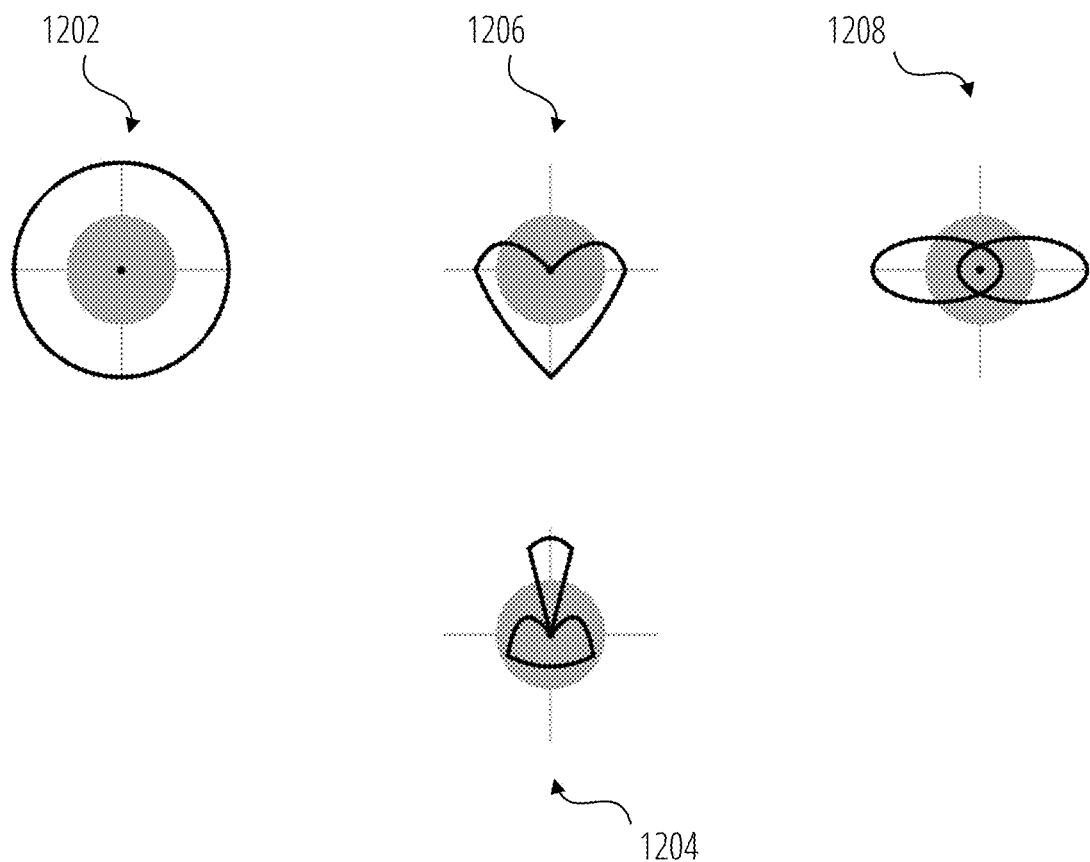
FIG. 12 illustrates different radiation patterns.

FIG. 12 shows radiation patters for various configurations. Four radiation patterns are displayed as pure geometric shapes-omnidirectional 1202, directional beam 1204, a cardioid 1206, and figure-8 1208.

Multiple radiation patterns available through electronic switching:
  Omnidirectional: All parasitic elements disabled, symmetric operation
  Cardioid: Selective parasitic element activation with 6 dB front-to-back ratio
  Figure-8: Opposite element pairs create bidirectional pattern
  Beam: Multiple element coordination creates 8 dBi gain directional pattern
  Null Steering: Specific null placement for interference rejection Operational Mode Configurations The disclosure provides four primary operational modes with seamless electronic switching:

Mode 1: Pure Segmented Operation (1.6-8 MHz)
  In this mode, segments 202-214 operate independently with:
    Flat tape conductors active for segments 202-210
    Individual varactor tuning for each segment
    Parasitic element beam steering
    Cap hat at minimum diameter (reduced loading)·
    Typical efficiency: 70-85% below 5 MHz Mode 2: Hybrid Folded Operation (3-20 MHz)
  This mode reconfigures the antenna into a folded monopole:
    Segments 202-210 connected in folded configuration
    Enhanced current distribution through folded geometry
    Cap hat at medium diameter for optimal loading
    Improved radiation resistance and efficiency
    Typical efficiency: 55-75% in mid-HF range Mode 3: Extended Coverage Operation (12-54 MHz)
High-frequency operation utilizes magnetic loop configuration:
    Segments 212-218 active in loop configuration
    Litz wire conductors optimized for VHF operation
    Segments 202-210 disabled to prevent interaction
    Cap hat segments function as beam steering elements
    Typical efficiency: 15-45% across extended range Mode 4: Multi-Mode Beam Steering (5-30 MHz)
  This mode combines all available technologies:
    All segments active with optimized phasing
    Both conductor types utilized based on frequency
    Cap hat segments provide elevation pattern control
    Full three-dimensional beam steering capability
    Optimized for maximum directional gain Three-Dimensional Beam Steering System The disclosure achieves three-dimensional beam steering through coordinated control of multiple subsystems, that control azimuth and elevation independent of each other.

Azimuthal Steering

Figure 13A:
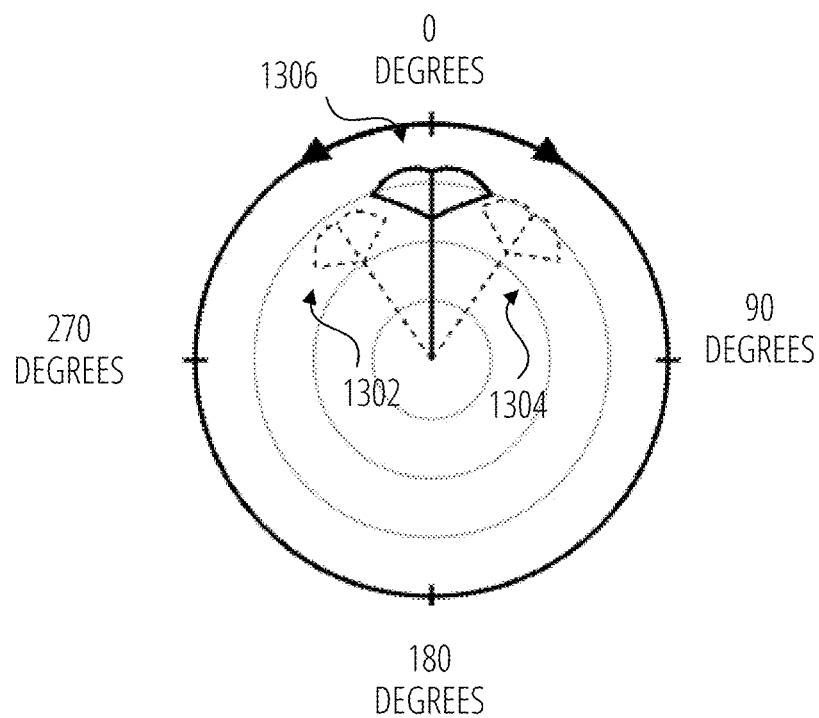
FIG. 13A is an azimuth view of beam forming.

FIG. 13A illustrates azimuthal beam-steering capability through an azimuthal polar plot with multiple beam positions,–35 degrees 1302, 0 degrees 1306, and a +35 degrees 1304.

The azimuthal steering range is +35° with 5° resolution and <50 µs switching times.

Figure 13B:
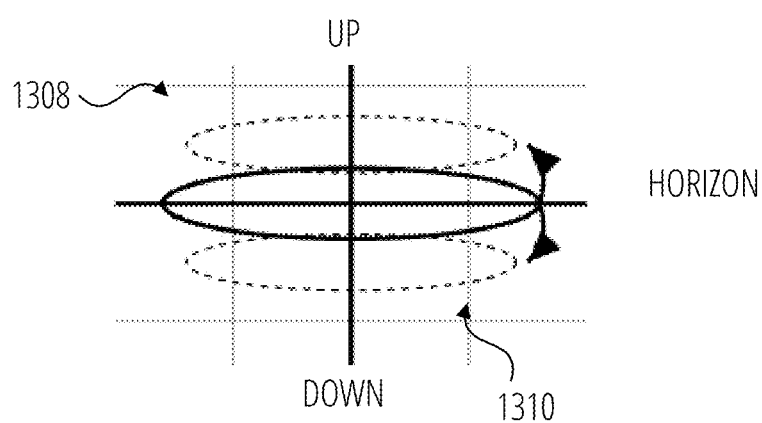
FIG. 13B is an elevation view of beam forming.

Traditional azimuthal beam steering is accomplished by relative phase adjustment between segments using varactor bias, control of eight traces 906-920 on cylindrical PCB substrate 222, and selective segment activation and power distribution Elevation Steering FIG. 13B illustrates elevation steering, ranging from +20 degrees 1308 to –20 degrees 1310, with 10° resolution and <100 µs switching time.

Elevation steering is achieved through cap hat asymmetry (selective segment activation creates elevation tilt), segment height phasing (different phase relationships create elevation nulls), and current distribution control (folded mode manipulation affects elevation patterns).

Performance

Figure 14:
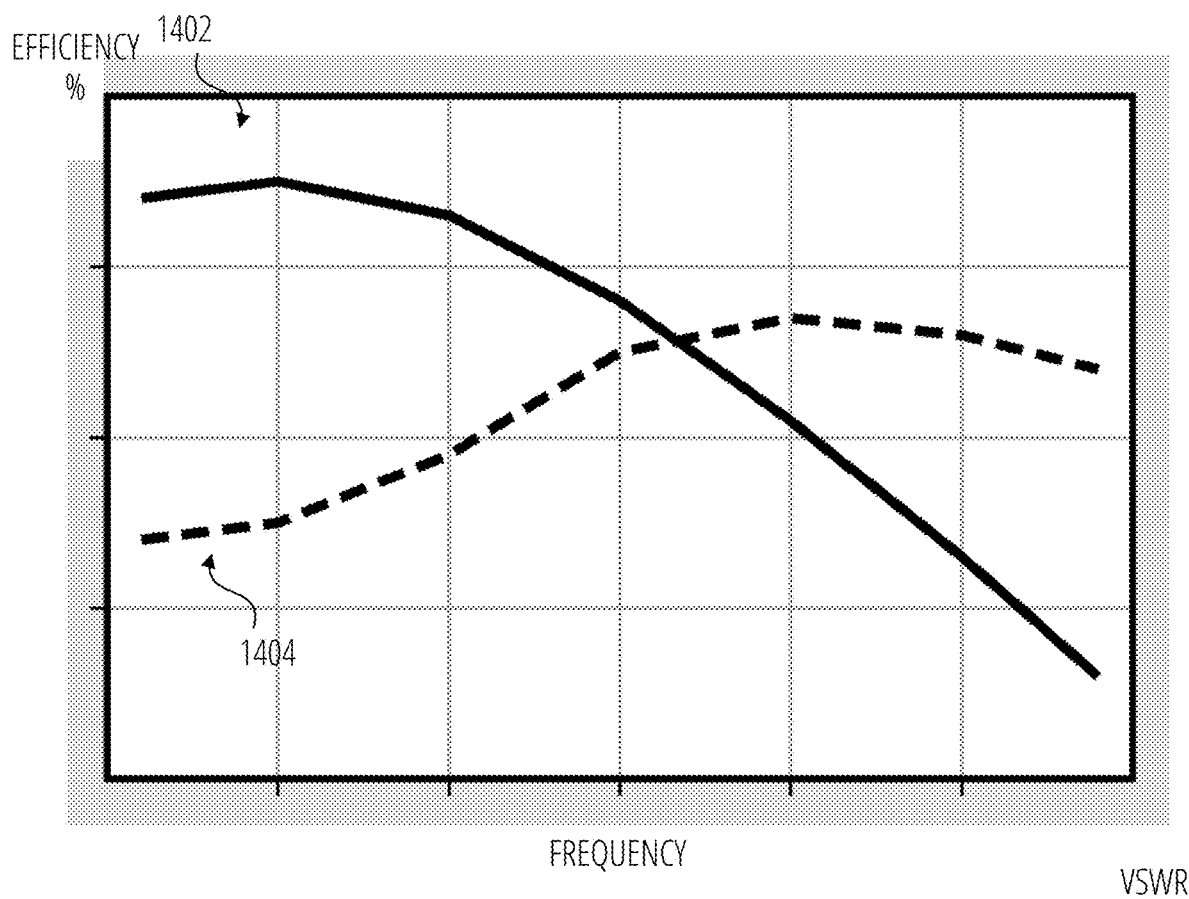
FIG. 14 shows extended frequency response characteristics and efficiency optimization across operational modes.

FIG. 14 depicts conductor performance. The graph shows two curves—a solid line representing flat tape 1402 conductor performance and a dashed line showing Litz wire 1404 performance across frequency. The curves intersect in the middle frequency range, demonstrating where one conductor type becomes superior to the other, with the flat tape performing better at lower frequencies and the Litz wire excelling at higher frequencies.

Figure 15:
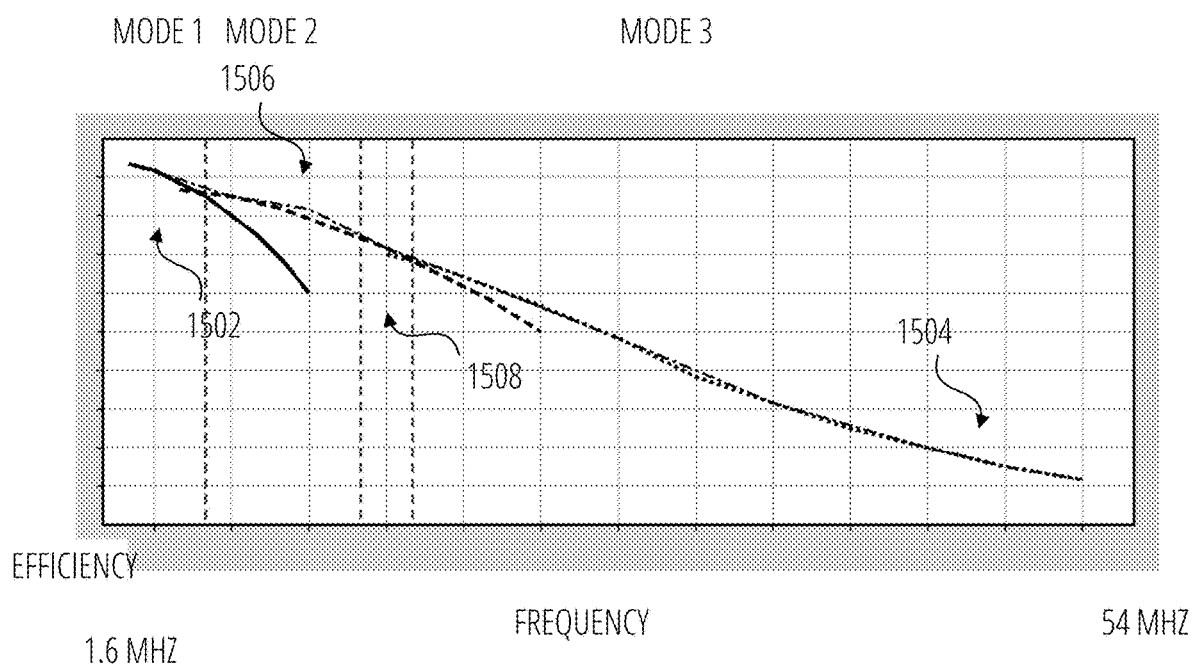
FIG. 15 shows efficiencies of the different modes.

FIG. 15 shows extended frequency response characteristics, from 1.6 to 54 MHz. The graph displays four efficiency curves using different line styles: a solid line for the first operational mode—segmented 1502, a dashed line for the second mode—folded 1506, a dotted line for the third mode—a loop 1504, and a dash-dot line representing the hybrid optimized performance envelope 1708. Vertical dashed lines indicate the boundaries between different operational modes.

Method of operation

Figure 16:
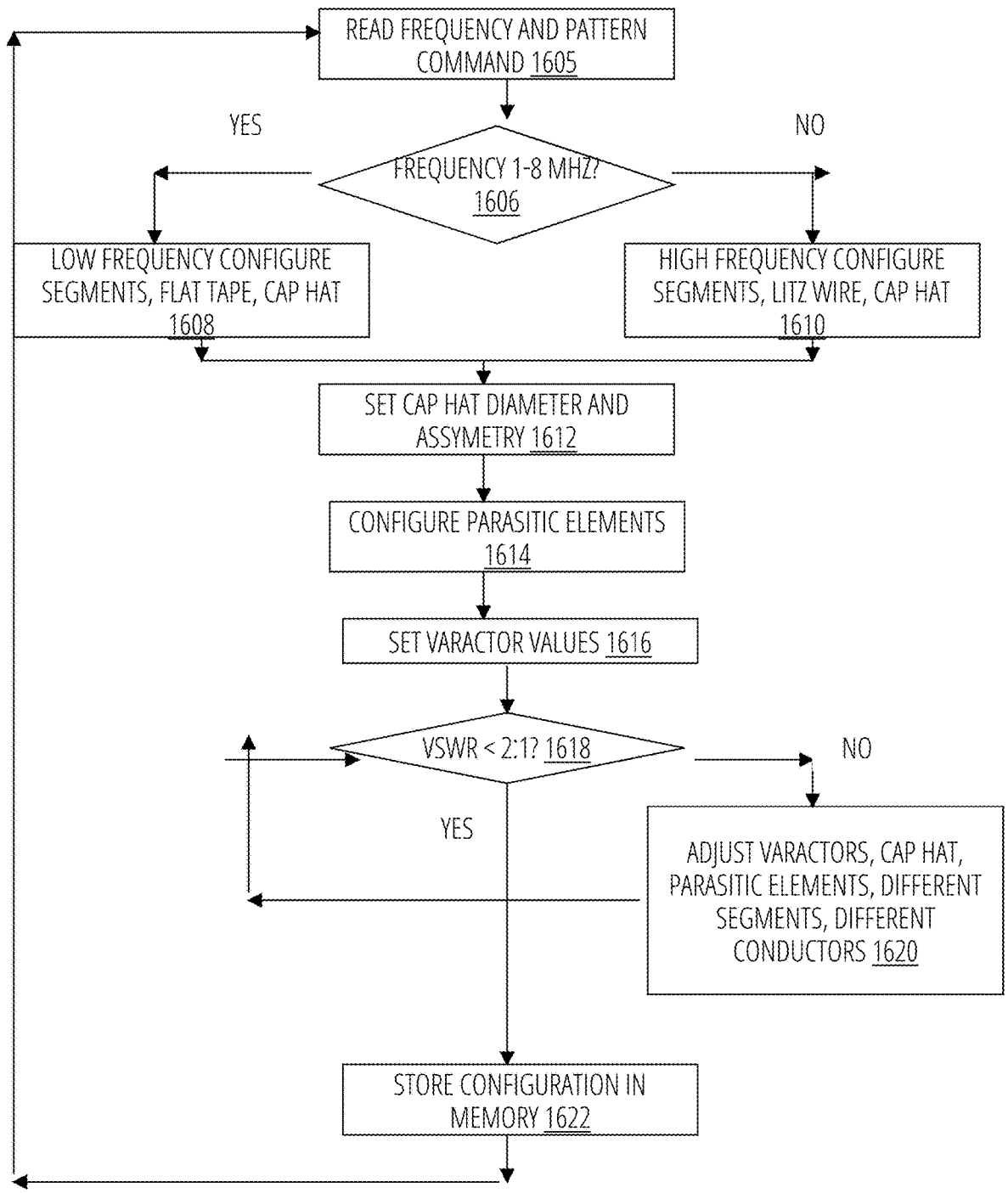
FIG. 16 is a flow chart showing a method for system operation.

FIG. 16 is a flow chart depicting system operation. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at the same time or in a specific sequence.

The system reads frequency and pattern command 1605 from the radio and tests whether frequency is between 1 and 8 MHz 1806. If it is, the system configures segments, flat tape, cap hat for low frequencies 1608. If it is not, the system configures segments, Litz wire, and cap hat for high frequencies 1610. It then sets cap hat diameter and asymmetry 1612, configures parasitic elements 1614, sets varactor values 1616, and tests whether the VSWR is less than 2:1? 1618. If it is, the system stores configuration in memory 1622 and loops back to the beginning. If it is not, the system adjusts the varactors, cap hat, parasitic elements, and tries different segments, and different conductors connections 1620, and retests the VSWR.

Mechanical Specifications

In one embodiment, the system has the following features
Total Height: 420 mm (including cap hat)
Maximum Diameter: 200 mm (cap hat extended)
Base Dimensions: 60 mm×60 mm×50 mm
Weight: 2.1 kg complete system

I claim:

1. A hybrid multi-band antenna system comprising:
    a ferrite core divided axially into a plurality of ferrite segments, each segment comprising different ferrite materials optimized for specific frequency ranges;
    a hybrid conductor system including both flat copper tape windings and Litz wire windings associated with said ferrite segments;
    electronic switching means for selecting between conductor types and for selectively connecting and disconnecting the individual ferrite segments;
    variable capacitive elements distributed along said windings;
    a segmented cap hat system with electronically controllable diameter and asymmetry;
    switchable parasitic elements providing three-dimensional beam steering with azimuthal and elevation control;
    multi-mode operation capability including electronic switching among segmented, folded monopole and magnetic loop configurations;
    automatic mode selection and performance optimization;
    control circuitry comprising hardware and software logic controlling connection of the ferrite segments, connection of the flat copper tape and Litz wire windings, operation of the variable capacitive elements, the diameter and asymmetry of the cap hat system, switching the parasitic elements, and switching among the segmented, folded monopole and magnetic loop configurations; and
    machine learning optimization for adaptive performance enhancement.

2. The antenna system of claim 1, wherein said hybrid conductor system comprises flat copper tape conductors optimized for frequencies from 1-8 MHz and Litz wire conductors optimized for frequencies from 5 to 54 MHz.

3. The antenna system of claim 1, wherein said segmented cap hat system comprises eight independently controllable segments enabling electronic diameter adjustment from 45 mm to 200 mm.

4. The antenna system of claim 1, wherein said ferrite segments comprise at least four different ferrite materials from the set consisting of Type 61, Type 43, Type 67, and Type 77 materials.

5. The antenna system of claim 1, wherein said electronic switching means comprises PIN diodes for conductor selection, segment activation, and mode configuration.

6. The antenna system of claim 1, wherein said variable capacitive elements comprise up to five varactor diodes per segment positioned at distributed locations along each winding.

7. The antenna system of claim 1, wherein said control circuitry includes machine learning algorithms for adaptive performance optimization.

8. The antenna system of claim 1, operating across an extended frequency range from 1.6 MHz to 54 MHz with electronic mode switching.

9. The antenna system of claim 1, wherein said multi-mode operation includes automatic frequency-dependent configuration selection.

10. The antenna system of claim 1 wherein the antenna system achieves efficiency ranging from 15% to 85% across a frequency range from 1.6 to 54 MHz.

11. The antenna system of claim 1, wherein said automatic optimization includes real-time impedance monitoring, pattern analysis, and adaptive algorithm implementation.

12. A method of operating a hybrid multi-band ferrite antenna comprising:
    determining optimal operational mode based on user-selected frequency and performance requirements;
    selecting one conductor winding type from the set consisting of flat tape, Litz wire, and a combination of flat tape and Litz wire);
    configuring ferrite core segments for segmented, folded monopole, or magnetic loop operation;
    adjusting cap hat diameter and asymmetry for impedance optimization and pattern control;
    setting variable capacitive elements for frequency tuning and harmonic suppression;
    configuring parasitic elements for desired radiation pattern and beam steering;
    implementing three-dimensional beam steering through coordinated control of multiple subsystems; and
    continuously monitoring and adapting system parameters for optimal performance.

13. The method of claim 12, wherein said selecting conductor type comprises electronic switching based on frequency-dependent loss optimization.

14. The method of claim 12, wherein said three-dimensional beam steering comprises independent azimuthal and elevation control.

15. The method of claim 12, further comprising machine learning adaptation based on performance history and propagation conditions.

* * * * *